United States Patent
Subramanian (10) Patent No.: US 9,813,443 B1
(45) Date of Patent: Nov. 7, 2017

(54) SYSTEMS AND METHODS FOR REMEDIATING THE EFFECTS OF MALWARE

(71) Applicant: Symantec Corporation, Mountain View, CA (US)

(72) Inventor: Sonia Subramanian, Marina Del Rey, CA (US)

(73) Assignee: Symantec Corporation, Mountain View, CA (US)

( * ) Notice: Subject to any disclaimer, the term of this patent is extended or adjusted under 35 U.S.C. 154(b) by 21 days.

(21) Appl. No.: 14/621,416

(22) Filed: Feb. 13, 2015

(51) Int. Cl.
*G06F 11/00* (2006.01)
*H04L 29/06* (2006.01)

(52) U.S. Cl.
CPC .................. *H04L 63/145* (2013.01)

(58) Field of Classification Search
CPC ............. H04L 63/1416; H04L 63/1408; H04L 63/145
See application file for complete search history.

(56) References Cited

U.S. PATENT DOCUMENTS

| | | | | |
|---|---|---|---|---|
| 7,624,443 B2 * | 11/2009 | Kramer | ................. | G06F 21/554 707/999.01 |
| 8,042,186 B1 * | 10/2011 | Polyakov | ............... | G06F 21/564 726/24 |
| 2010/0146589 A1 * | 6/2010 | Safa | ........................ | G06F 21/52 726/3 |
| 2010/0318986 A1 * | 12/2010 | Burke | ................. | G06F 11/3409 717/176 |
| 2011/0178972 A1 * | 7/2011 | Navarro | .............. | G06F 11/1435 706/47 |
| 2013/0276114 A1 * | 10/2013 | Friedrichs | ............... | G06F 21/56 726/23 |
| 2014/0325656 A1 * | 10/2014 | Sallam | .................... | G06F 21/52 726/24 |

OTHER PUBLICATIONS

How Volume Shadow Copy Service Works, https://technet.microsoft.com/en-us/library/cc785914%28v=ws.10%29.aspx, as accessed Dec. 17, 2014, Microsoft, (Mar. 28, 2003).
"Symantec Unveils New Advanced Threat Protection", http://www.symantec.com/about/news/release/article.jsp?prid=20140505_01. as accessed Dec. 17, 2014, Symantec Corporation, (May 5, 2014).

* cited by examiner

*Primary Examiner* — Ali Abyaneh
(74) *Attorney, Agent, or Firm* — FisherBroyles, LLP (57) ABSTRACT

The disclosed computer-implemented method for remediating the effects of malware may include (1) identifying a file on a client device, (2) determining, using a digital fingerprint that identifies the file, that the file's reputation is unknown, (3) in response to determining that the file's reputation is unknown, logging changes made by the file to the client device, (4) determining that the changes made by the file are to be reversed, and (5) in response to determining that the changes made by the file are to be reversed, instructing the client device to reverse the changes made by the file to the client device. Various other methods, systems, and computer-readable media are also disclosed.

12 Claims, 7 Drawing Sheets

SYSTEMS AND METHODS FOR REMEDIATING THE EFFECTS OF MALWARE

BACKGROUND

Malware, in all of its various forms, continues to evolve and expand at an ever-increasing rate. One fairly recent form of malware, known as ransomware, attempts to restrict or prevent access to valuable data until the system owner pays or otherwise satisfies a ransom. For example, the ransomware known as CryptoLocker encrypts data files until the system owner pays a monetary ransom. Another recent form of malware, known as targeted threats (also referred to as advanced persistent threats (APTs)), includes custom malware designed to target a specific entity. For example, targeted threats may target sensitive data, thereby causing monetary and reputation damages to affected organizations. Targeted threats may also be designed to destroy valuable data or sabotage computer-controlled systems.

Unfortunately, many of these newer forms of malware may not be detected until after the resulting damage occurs. For example, since targeted threats may be custom-designed for a specific entity, malware scanners and reputation services may not encounter or discover a particular targeted threat until after it reaches and infects a targeted system. Similarly, ransomware and other forms of malware may evade detection by being polymorphic, meaning the malware executable file is modified somewhat each time it is replicated.

By avoiding detection, malware may be able to successfully destroy, modify, or encrypt data files, or even deploy additional malware. At this point, system administrators may be left trying to determine the extent of the damage, restore data from backups, and/or rebuild or reimage damaged systems. Accordingly, the instant disclosure identifies and addresses a need for additional and improved systems and methods for remediating the effects of malware.

SUMMARY

As will be described in greater detail below, the instant disclosure describes various systems and methods for remediating the effects of malware by identifying files with unknown reputations and logging changes made by these files. If the systems and methods described herein ever determine that one of these files includes malware or is otherwise threatening or damaging the computing system hosting the file, these systems and methods may instruct the computing system to reverse the logged changes. In some examples, the systems and methods described herein may log the above-described changes on a remote device to protect the change log from malware that has infected the computing system. The systems and methods described herein may also issue instructions to reverse these logged changes from a remote device so that, even if the computing device becomes unresponsive, the computing device can be restored to a usable state.

In one example, a computer-implemented method for remediating the effects of malware may include (1) identifying a file on a client device, (2) determining, using a digital fingerprint that identifies the file, that the file's reputation is unknown, (3) in response to determining that the file's reputation is unknown, logging changes made by the file to the client device, (4) determining that the changes made by the file are to be reversed, and (5) in response to determining that the changes made by the file are to be reversed, instructing the client device to reverse the changes made by the file to the client device.

In some examples, logging changes made by the file to the client device may include logging the changes on a remote device. In other examples, logging changes made by the file to the client device may include logging the changes on the client device itself. In some examples, determining that the changes made by the file are to be reversed may include determining, at a remote device, that the changes made by the file are to be reversed, and instructing the client device to reverse the changes may include instructing, via the remote device, the client device to reverse the changes.

In one example, logging changes made by the file may include obtaining a snapshot of a volume and comparing contents of one or more additional files to a copy of the files in the snapshot to identify changes in the contents of the files. In addition, determining that the changes made by the file are to be reversed may include (1) determining that the reputation for the file is untrustworthy, (2) determining that the file may include malware, (3) detecting malicious behavior performed by the file, (4) receiving a request from a user to reverse changes made by the file, (5) receiving a request from a client agent to reverse changes made by the file, (6) receiving a request from an information security service to reverse changes made by the file, (7) detecting damaging behavior performed by the file, and/or (8) receiving notification that the file contains a security vulnerability.

In some examples, determining that the changes made by the file are to be reversed may include determining that the changes made by several files of unknown reputation are to be reversed. In addition, instructing the client device to reverse the changes made by the file to the client device may include providing the client device with the logged changes made by the file to the client device. In one embodiment, the logged changes may include changes made by the file to the client device during a time interval. In some examples, instructing the client device to reverse the changes made by the file to the client device may include providing the client device with a location of a volume snapshot that was created before the file was encountered by the client device.

In one embodiment, a system for implementing the above-described method may include several modules stored in memory, such as (1) an identification module that identifies a file on a client device, (2) a reputation module that determines, using a digital fingerprint that identifies the file, that the file's reputation is unknown, (3) a logging module that, in response to determining that the file's reputation is unknown, logs changes made by the file to the client device, (4) an evaluation module that determines that the changes made by the file are to be reversed, and (5) a notification module that, in response to determining that the changes made by the file are to be reversed, instructs the client device to reverse the changes made by the file to the client device. The system may also include one or more physical processors configured to execute the identification module, the reputation module, the logging module, the evaluation module, and the notification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a file on a client device, (2) determine, using a digital fingerprint identifying the file, that the file's reputation is unknown, (3) in response to determining that the file's reputation is unknown, log changes made by the file to the client device, (4) determine that the changes made by the file are to be reversed, and (5) in response to determining that the changes made by the file are to be reversed, instruct the client device to reverse the changes made by the file to the client device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for remediating the effects of malware. As will be explained in greater detail below, the systems and methods described herein may identify files with unknown reputations on client devices, log changes made by these files, determine when the logged changes should be reversed, and instruct the client devices to reverse these logged changes. By doing so, the systems and methods described herein may remediate the effects of targeted threats that may not have been detected before malicious behavior occurred, or the effects of malware (such as ransomware) that blocks system operations and/or user actions. In some examples, the systems and methods described herein may maintain a database of these logged changes on a remote device in order to protect the change log from the effects of malware. The systems and methods described herein may also instruct client devices to reverse the logged changes via a remote device so that, even if a client device becomes unresponsive due to a malware attack, the client device can be restored to a usable state.

The following will provide, with reference to FIGS. 1-3 and 5, detailed descriptions of exemplary systems for remediating the effects of malware. Detailed descriptions of corresponding computer-implemented methods will also be provided in connection with FIG. 4. In addition, detailed descriptions of an exemplary computing system and network architecture capable of implementing one or more of the embodiments described herein will be provided in connection with FIGS. 6 and 7, respectively.

Figure 1:
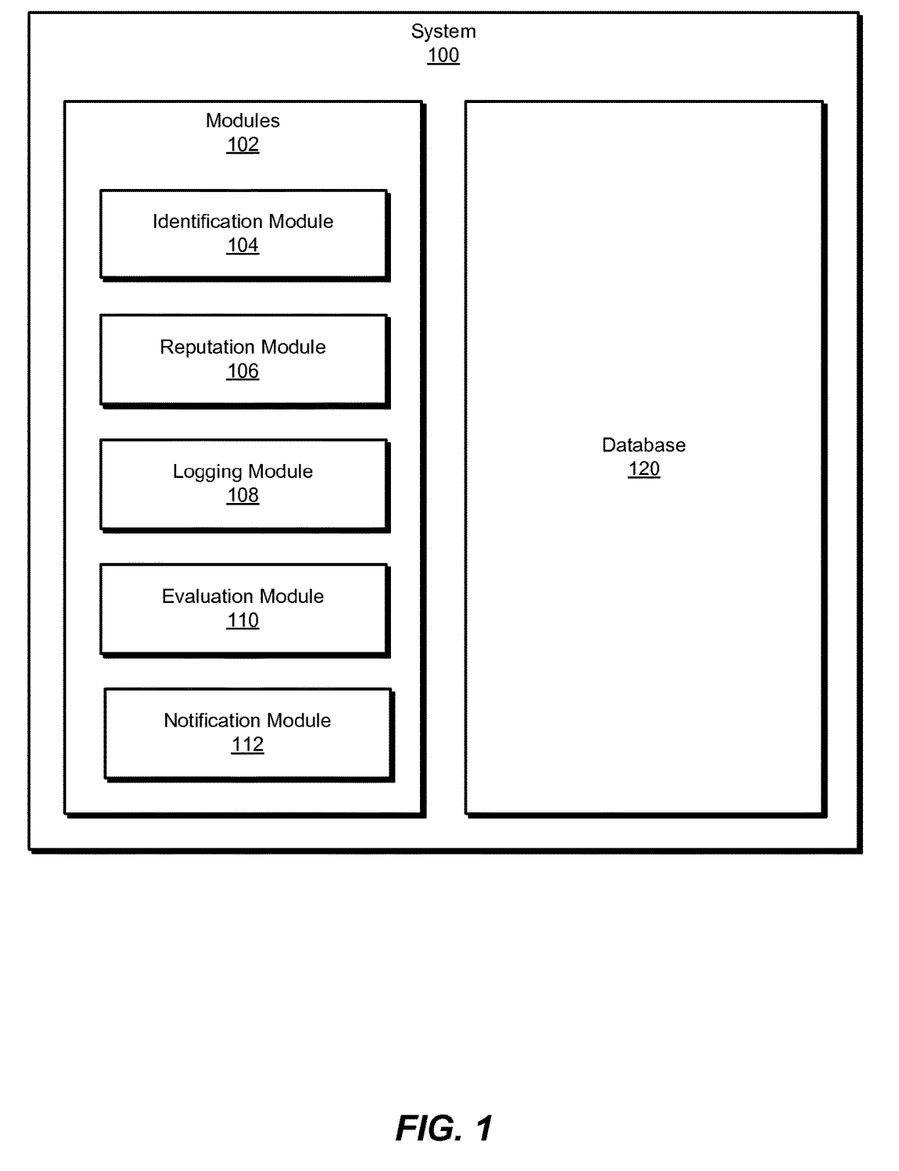
FIG. 1 is a block diagram of an exemplary system for remediating the effects of malware.

FIG. 1 is a block diagram of an exemplary system 100 for remediating the effects of malware. As illustrated in this figure, exemplary system 100 may include one or more modules 102 for performing one or more tasks. For example, and as will be explained in greater detail below, exemplary system 100 may include an identification module 104 that may identify a file on a client device. Exemplary system 100 may additionally include a reputation module 106 that may determine, using a digital fingerprint identifying the file, that the file's reputation is unknown. Exemplary system 100 may also include a logging module 108 that may, in response to determining that the file's reputation is unknown, log changes made by the file to the client device. Exemplary system 100 may additionally include an evaluation module 110 that may determine that the changes made by the file to the client device are to be reversed. Exemplary system 100 may also include a notification module 112 that may, in response to determining that the changes made by the file are to be reversed, instruct the client device to reverse the changes made by the file to the client device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIGS. 2 and 3 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, and as will be described in greater detail below, database 120 may be configured to store a log of changes made by files with unknown reputations. Database 120 may represent portions of a single database or computing device or a plurality of databases or computing devices. For example, database 120 may represent a portion of server 206 in FIG. 2 and/or computing device 202 in FIG. 3. Alternatively, database 120 in FIG. 1 may represent one or more physically separate devices capable of being accessed by a computing device, such as server 206 and/or computing device 202 in FIGS. 2 and 3, computing system 610 in FIG. 6, and/or portions of exemplary network architecture 700 in FIG. 7.

Figure 2:
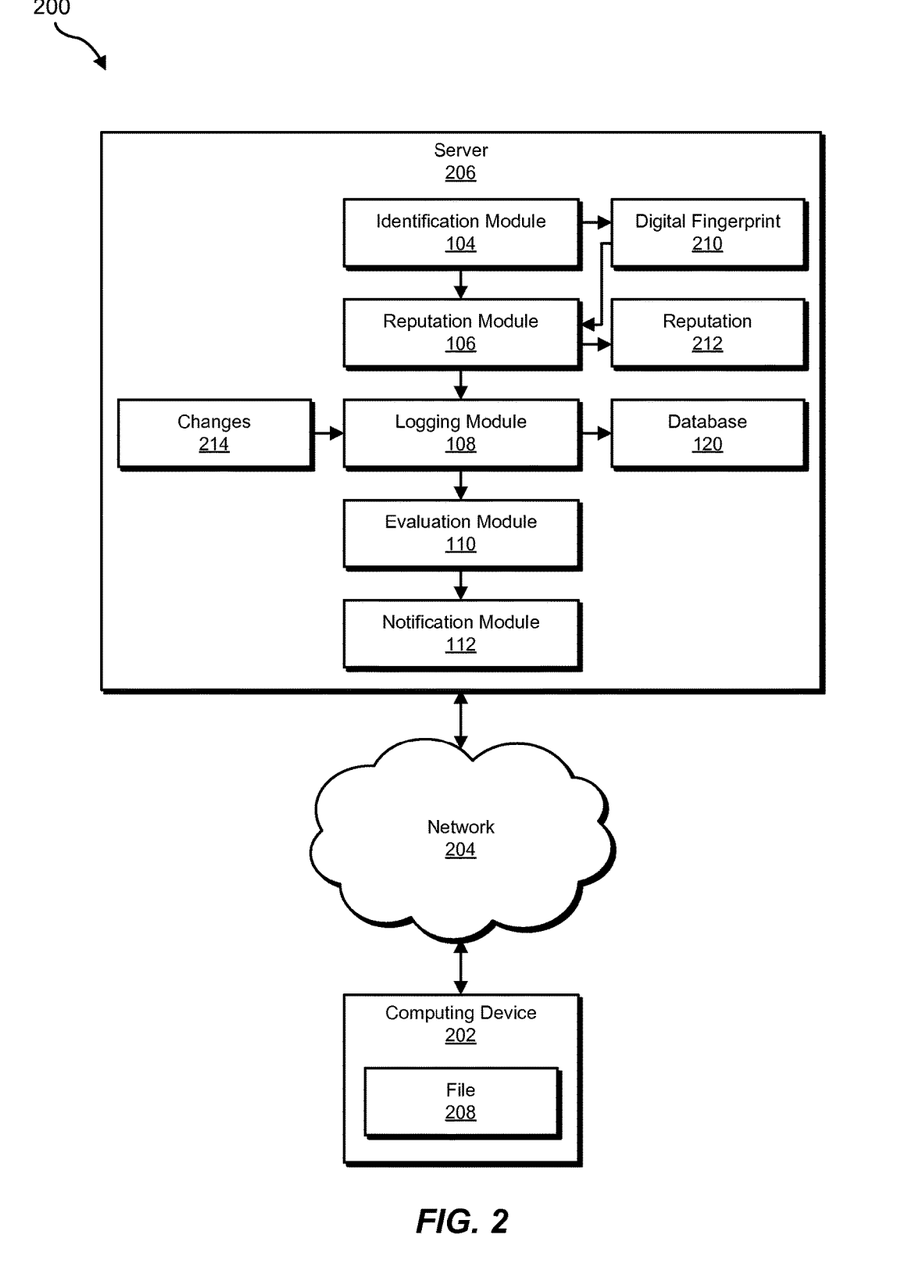
FIG. 2 is a block diagram of an additional exemplary system for remediating the effects of malware.
Figure 3:
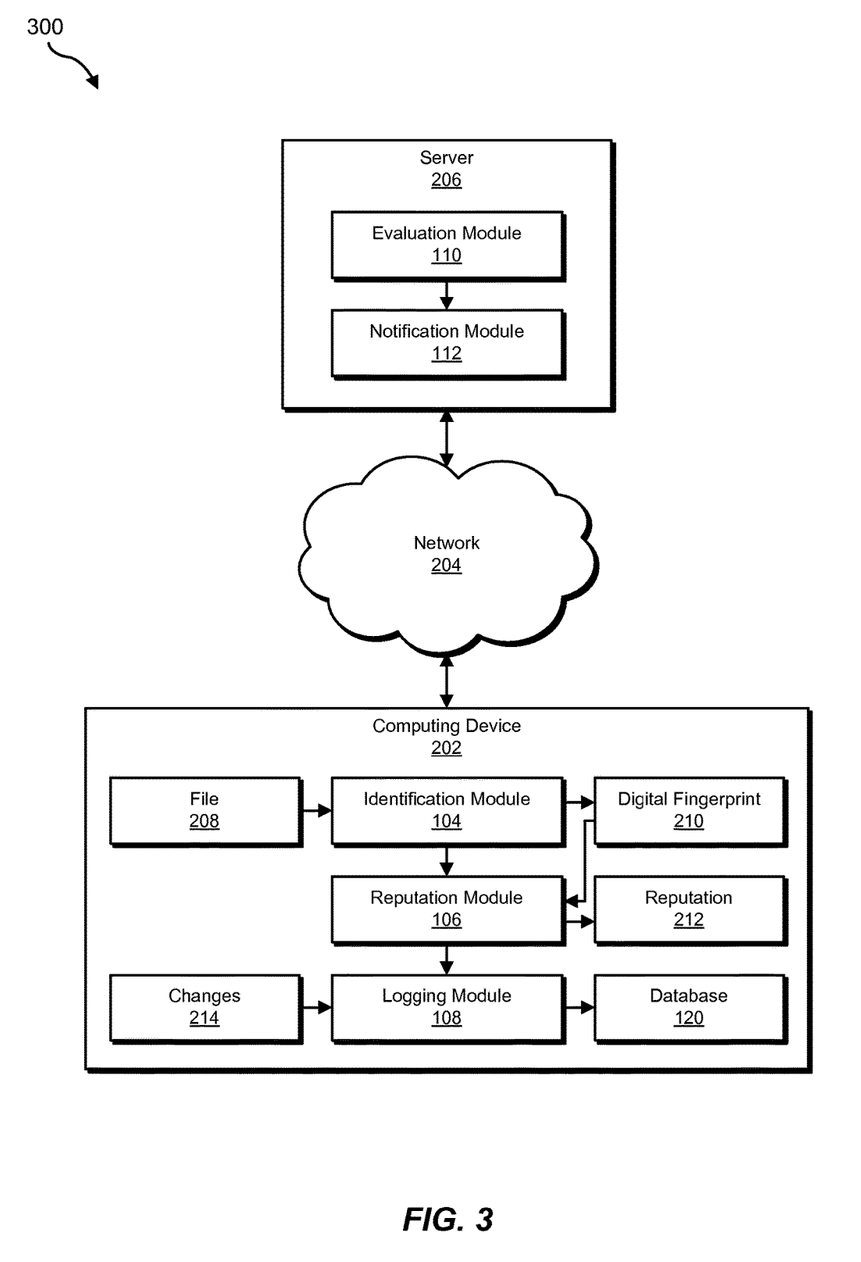
FIG. 3 is a block diagram of an additional exemplary system for remediating the effects of malware.

Exemplary system 100 in FIG. 1 may be implemented in a variety of ways. For example, all or a portion of exemplary system 100 may represent portions of exemplary system 200 in FIG. 2 and/or exemplary system 300 in FIG. 3. As shown in FIG. 2, system 200 may include a computing device 202 in communication with a server 206 via a network 204. Server 206 may be programmed with one or more of modules 102 and/or may store all or a portion of the data in database 120. Additionally or alternatively, as shown in FIG. 3, computing device 202 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to remediate the effects of malware. For example, and as will be described in greater detail below, identification module 104 may identify a file 208 on computing device 202. Reputation module 106 may then determine, using digital fingerprint 210, that the file's reputation 212 is unknown. Logging module 108 may, in response to determining that the file's reputation 212 is unknown, log changes 214 made by file 208 to computing device 202. At some later point in time, evaluation module 110 may determine that changes 214 made by file 208 are to be reversed (e.g., in response to determining that file 208 is malicious). In response to determining that changes made by file 208 are to be reversed, notification module 112 may then instruct computing device 202 to reverse changes 214 made by file 208 on computing device 202.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of receiving, comparing, and/or storing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 4:
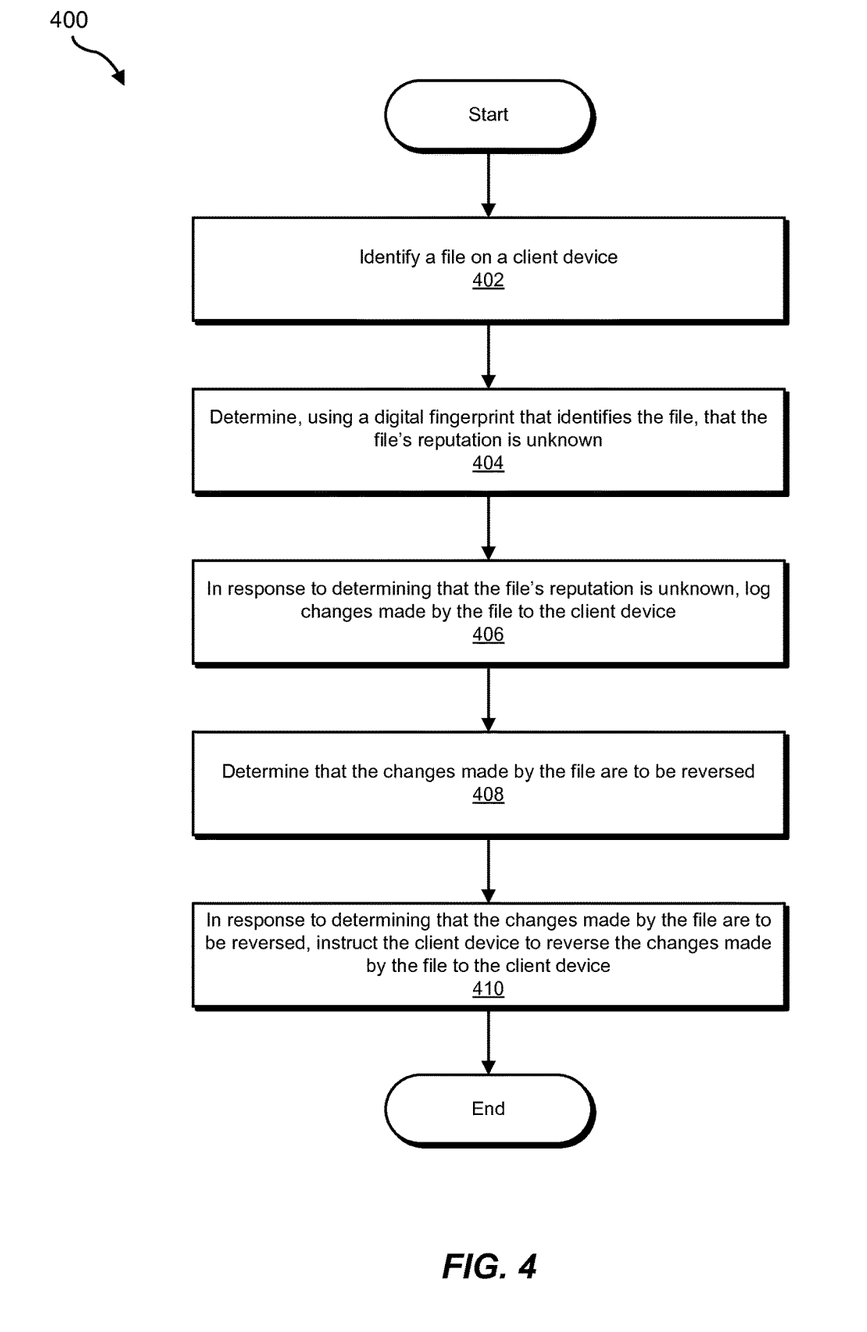
FIG. 4 is a flow diagram of an exemplary method for remediating the effects of malware.

FIG. 4 is a flow diagram of an exemplary computer-implemented method 400 for remediating the effects of malware. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, system 300 in FIG. 3, computing system 610 in FIG. 6, and/or portions of exemplary network architecture 700 in FIG. 7.

As illustrated in FIG. 4, at step 402 one or more of the systems described herein may identify a file on a client device. For example, identification module 104 may, as part of server 206 in FIG. 2, identify a file 208 encountered by computing device 202. Alternatively, identification module 104 may, as part of computing device 202 in FIG. 3, identify file 208 when it is encountered by computing device 202.

Identification module 104 may identify a file for a variety of reasons, including when a file is first encountered by a client device (e.g., downloaded or copied onto the client device) or when an existing file is modified. Identification module 104 may also identify a file in a variety of ways. In one example, the systems and methods described herein may use a digital fingerprint to identify a file. The phrase "digital fingerprint," as used herein, generally refers to an identifier that a security system may use to uniquely identify a file. Examples of digital fingerprints include, without limitation, values derived from applying cryptographic hash functions (such as MD5, SHA1, or SHA256) to all or part of a file.

For example, as shown in FIG. 2, identification module 104 may receive a digital fingerprint 210 consisting of an MD5 hash of file 208 from a client agent running on computing device 202. Alternatively, as shown in FIG. 3, identification module 104 may (while executing on computing device 202) obtain or generate digital fingerprint 210 by calculating an MD5 hash of file 208 or by receiving a hash of file 208 from a client agent executing on computing device 202.

At step 404, one or more of the systems described herein may determine, using a digital fingerprint that identifies the file, that the file's reputation is unknown. For example, reputation module 106 may, as part of server 206 in FIG. 2, determine, using digital fingerprint 210, that the reputation 212 of file 208 is unknown. Alternatively, reputation module 106 may, as part of computing device 202 in FIG. 3, determine, using digital fingerprint 210, that reputation 212 of file 208 is unknown.

The term "reputation," as used herein, generally refers to an indication of the trustworthiness, prevalence, prominence, community opinion, and/or reputation of a file. A reputation may be based on a variety of factors, such as the percentage of devices or number of devices on which the file occurs (e.g., the prevalence of a software program in a wide area network, on the Internet, and/or on devices and networks outside a local network, etc.), the length of time the file has been present on one or more devices, an indication of the reliability of the publisher or developer of the file, an indication of the likelihood that the file may contain malware, a community rating of the file, an evaluation of the file by a trusted entity, and/or any other suitable factor. A file's reputation may be expressed by a numerical score or by a rating, such as "good," "bad," or "unknown."

Reputation module 106 may determine that the file's reputation is unknown in a variety of ways. For example, reputation module 106 may query a reputation service using the file's digital fingerprint to obtain a rating of the file's reputation. The reputation service may be a publicly available service or a private or commercial service of a business, security software developer, or Internet Service Provider.

At step 406, one or more of the systems described herein may, in response to determining that the file's reputation is unknown, log changes made by the file to the client device. For example, logging module 108 may, as part of server 206 in FIG. 2, and in response to determining that the reputation 212 of file 208 on computing device 202 is unknown, log changes 214 made by file 208 to computing device 202. Alternatively, logging module may, as part of computing device 202 in FIG. 3, and in response to determining that the reputation 212 of file 208 on computing device is unknown, log changes 214 made by file 208 to computing device 202.

As shown in FIGS. 2 and 3, and as mentioned previously, database 120 may be located on computing device 202 and/or server 206. In another example, database 120 may be located on a separate device, such as a database server.

Logging module 108 may log changes made by the file to the client device in a variety of ways. For example, logging module 108 may store descriptions of changes made to files and other attributes of computing device 202 in database 120 on server 206. In another example, logging module 108 may store descriptions of changes made to computing device 202 in database 120 on computing device 202. Examples of change descriptions include, without limitation, copies of data appended to files, copies of deleted files or portions of files, identifiers for created files, and/or records of file name or attribute changes. Change descriptions may also include records of changes made to file contents that include the location of the changes and the data at the change location before and after the changes. In some examples, logging module 108 may log changes made by the file by storing changes made to a registry entry. Registry entry changes may include the entire modified entry or a record of the modified portion of the entry.

In some examples, logging module 108 may log changes made by the file by obtaining a snapshot of a volume and comparing contents of at least one additional file to a copy of the file in the snapshot to identify changes in the contents of the file. In another example, logging module 108 may compare the contents of a file to a copy of the file included in a backup other than a snapshot.

The term "volume snapshot," as used herein, generally refers to any representation of a volume of data and/or a portion of a volume of data at a certain point in time. Some storage devices, such as disk arrays, include the capability of generating a hardware snapshot of volumes stored on the device. Examples of snapshots may also include a copy of a virtual machine disk file (VMDK) or a shadow copy produced by the Volume Snapshot Service (VSS) of MICROSOFT WINDOWS.

As an example of how logging module 108 may log changes made by the file using a volume snapshot, MICROSOFT WINDOWS VSS may be configured to obtain a snapshot of a volume at regular intervals, such as at a certain time every day. In this example, logging module 108 may compare the contents of a file located in the volume to the copy of the file located in a volume snapshot to determine whether and how the contents of the file have been modified since VSS obtained the volume snapshot.

Figure 5:
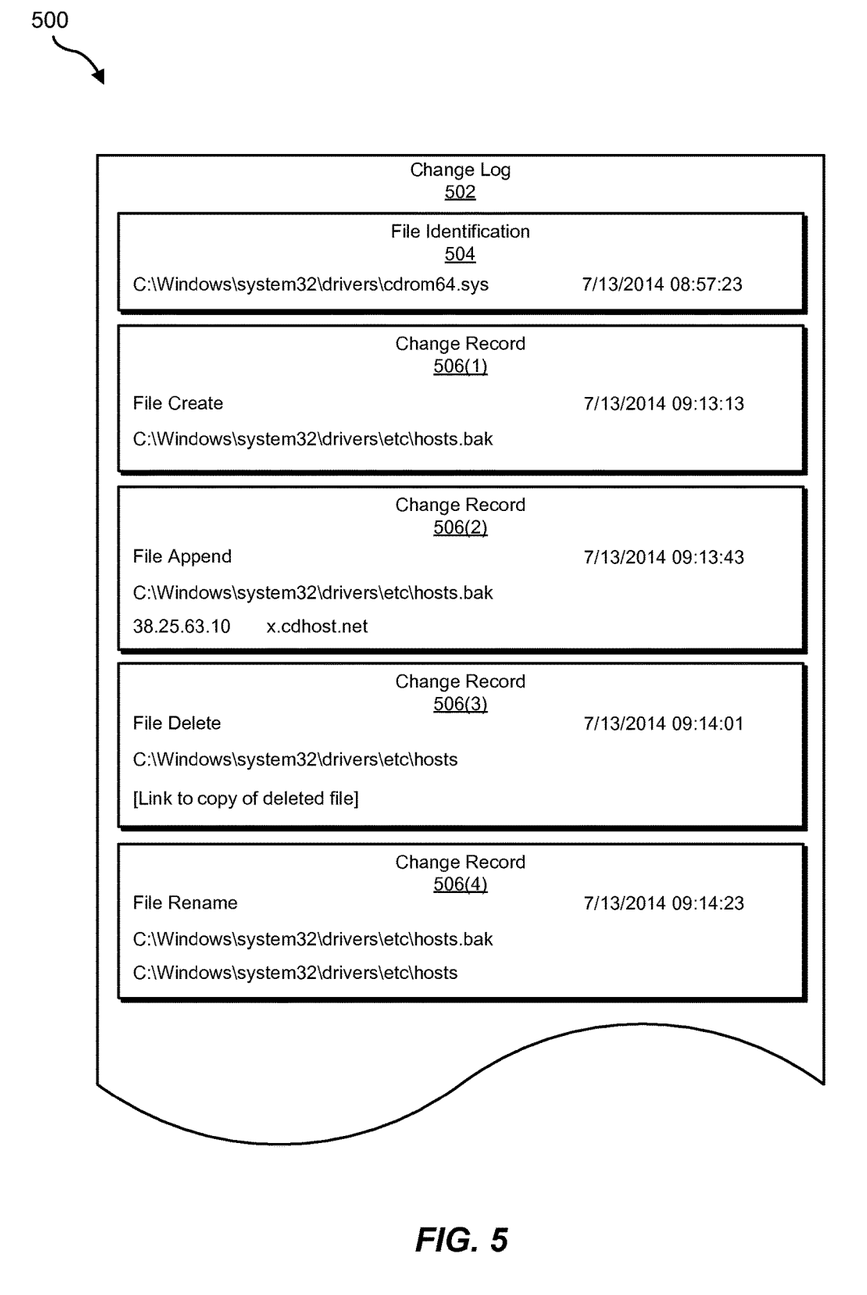
FIG. 5 is a block diagram of an exemplary change log.

FIG. 5 is a block diagram illustrating the contents of an exemplary change log 502 that logging module 108 may maintain. In this example, logging module 108 may maintain change log 502 to record changes a file with an unknown reputation makes on a client device so that the changes can be reversed if it is later determined to be necessary (e.g., if the file is later found to contain malware). As shown in this figure, change log 502 may include a file identification 504 that identifies the file for which logging module 108 is maintaining change log 502. Change log 502 may also include change records 506(1)-(4) that describe changes to the client system made by the file identified in file identification 504.

In this example, file identification 504 indicates the name and location of the file (i.e., "C:\Windows\system32\drivers\cdrom64.sys") and includes a timestamp (i.e., "7/13/2014 08:57:23") indicating when the file was created on the computing system. Change records 506(1)-(4) indicate changes made to other files on the computing system by the file identified in file identification 504, along with timestamps indicating when the changes took place. Change record 506(1) indicates that the file created a file named "C:\Windows\system32\drivers\etc\hosts.bak." Change record 506(2) indicates that the file appended the string "38.25.63.10 x.cdhost.net" to the newly created file. Change record 506(3) indicates that the file deleted the file named "C:\Windows\system32\drivers\etc\hosts." Change record 506(3) also includes a link to a copy of the deleted file. Change record 506(4) indicates that the file renamed "C:\Windows\system32\drivers\etc\hosts.bak." to "C:\Windows\system32\drivers\etc\hosts."

Logging module 108 may log changes made by a file on a client device so that the changes can be reversed if, for example, the file is later determined to contain malware. In some examples, logging module 108 may only log changes made by files with unknown reputations since logging changes made by all files may require considerable network bandwidth and storage capacity. Files that are known to have a bad reputation may be removed or quarantined on the client system, and there are fewer potential advantages to logging changes made by files known to have a good reputation. As such, by logging changes made by files with unknown reputations, the systems described herein may decrease the potential for loss should these files prove to be part of a targeted threat without excessively burdening computing resources.

As detailed above, in some examples, logging module 108 may remotely log changes made by a file to a client device. In these examples, by remotely logging changes made by files with unknown reputations (as opposed to simply logging such changes locally on the client device itself), the systems described herein may protect the change log from being compromised by a malware attack on the client device. Additionally, maintaining the change log on a remote device may facilitate remotely initiating the process of reversing changes made by a file to the client device. As will be described in greater detail below, even when the client device becomes unresponsive (such as when the system is under attack by ransomware), a user may submit a request to the remote device to reverse file changes stored in a change log on the remote server. In addition, maintaining the change log on a remote device may facilitate identifying and reversing changes made by a file that is present on multiple computing devices.

At step 408, one or more of the systems described herein may determine that the changes made by the file are to be reversed. For example, evaluation module 110 may, as part of server 206 in FIG. 2, determine that changes 214 made by file 208 to computing device 202 are to be reversed. In another example, evaluation module 110 may, as part of computing device 202 in FIG. 3, determine that changes 214 made by file 208 to computing device 202 are to be reversed.

Evaluation module 110 may determine that changes made by the file are to be reversed in a variety of ways and in a variety of contexts. For example, evaluation module 110 may determine that the reputation of the file is no longer unknown, and instead that the file is untrustworthy. For example, evaluation module 110 may receive a notification from a reputation service that the file previously identified as having an unknown reputation is now recognized to be untrustworthy. In another example, evaluation module 110 may receive a notification from a malware detection agent running on the computing device that the agent has determined that the file includes malware. For example, the agent may have received notification that files matching the digital fingerprint of file 208 have been determined to include malware. In another example, the agent may have detected the file engaging in malicious behavior or causing other damage that threatens the computing system, such as damage resulting from a software bug.

In one example, determining that the changes made by the file are to be reversed may include determining, at a remote device, that changes made by the file are to be reversed. For example, as shown in FIG. 2, evaluation module 110 may determine that changes made by the file are to be reversed by analyzing the change log contained in database 120 on server 206. As detailed above, storing the change log on a remote device may protect the change log from the effects of a malware infection on the client device. Locating evaluation module 110 on a remote device may also prevent a malware infection on the client device from affecting the process of analyzing the change log and/or determining that changes made by the file are to be reversed.

In other examples, evaluation module 110 may determine that changes made by the file are to be reversed in response to a request. For example, evaluation module 110 may provide a mechanism for a user to directly submit a request to reverse changes made by the file (e.g., either all changes made by the file, or changes made during a specified period of time). A mechanism of this type may be useful when the computing system becomes inaccessible, such as when the system is under attack by ransomware.

In another example, evaluation module 110 may receive a request from a client agent running on the computing system to reverse changes made by the file. In another example, evaluation module 110 may receive a request from an information security service to reverse changes made by the file, for example, upon detecting that the file contains a security vulnerability.

In one example, determining that the changes made by the file are to be reversed may include determining that the changes made by a group of files of unknown reputation are to be reversed. For example, if the source of a computing system malfunction is unknown, a user or system administrator may choose to reverse changes made by several files with unknown reputations in an effort to diagnose and/or remediate the malfunction.

At step 410, one or more of the systems described herein may, in response to determining that the changes made by the file are to be reversed, instruct the client device to reverse the changes made by the file to the client device. For example, notification module 112 may, as part of server 206 in FIG. 2, and in response to determining that changes 214 by file 208 are to be reversed, instruct computing device 202 to reverse changes 214 made by file 208 to computing device 202. Alternatively, notification module 112 may, as part of computing device 202 in FIG. 3, and in response to determining that changes 214 by file 208 are to be reversed, instruct computing device 202 to reverse changes 214 made by file 208 to computing device 202.

Notification module 112 may instruct the client device to reverse changes made by the file in a variety of ways. For example, notification module 112 may instruct the client device to reverse the changes made by the file by providing the client device with the logged changes made by the file to the client device. For example, using the changes shown in change log 502 in FIG. 5, notification module 112 may provide the client device with the saved copy of C:\Windows\system32\drivers\etc\hosts and instruct the client device to replace the existing file at that location with the saved copy provided. In another example, as shown in FIG. 2, notification module 112 running on server 206 may instruct a client agent running on the client device to restart in a safe mode that loads only a minimal set of programs and drivers before providing the client device with the logged changes. Doing so may, for example, facilitate remediation of ransomware or other forms of malware that block system operations or user input.

In another embodiment, notification module 112 may provide the client device with logged changes made during a time interval. For example, a malware detection agent may determine that the file is a benign program infected with malware, and that any changes made by the program after the malware became activated should be reversed.

In another embodiment, logging module 108 may maintain its log of changes the file makes to the client on the client device. Notification module 112 may then instruct the client device to reverse the logged changes by (1) providing a client agent with the digital fingerprint that identifies the file and (2) instructing the client agent to reverse the changes associated with the specified file.

In some examples, notification module 112 may instruct the client device to reverse the changes made by the file by providing the client device with a location of a volume snapshot. A volume snapshot may contain unmodified copies of files that a client agent may use to reverse file changes by obtaining unmodified copies of the files. For example, when a program with an unknown reputation is installed on a client device, the program may include malware that makes a number of undesirable changes to the device during the install process. If the device reboots after program installation, the undesirable changes may not yet have been logged, particularly if the log is stored on a remote device. If evaluation module 110 determines at a later time that the changes made by the program should be reversed, notification module 112 may provide a client agent with the location of a volume snapshot obtained before the program was installed, from which the client agent may obtain unmodified copies of files.

As explained in connection with method 400 above, the systems and methods described herein may enable users and administrators to remediate the effects of targeted threats that may not have been detected before they began adversely affecting client devices. For example, by logging changes made to a computing device by a file with an unknown reputation, the systems and methods described herein may be able to help the computing device reverse these logged changes if the file is later determined to be malicious.

In some examples, by logging changes made by the file on a remote device, the systems and methods described herein may both protect the change log from being compromised by a malware attack on the computing device and facilitate initiating the process of reversing these changes. For example, the file may compromise the computing device to the point that the user is unable to access the device (such as with a ransomware attack). In this example, the user may access the remote device using another computing device and instruct the remote device to reverse changes made by the file or changes made during a time interval.

Figure 6:
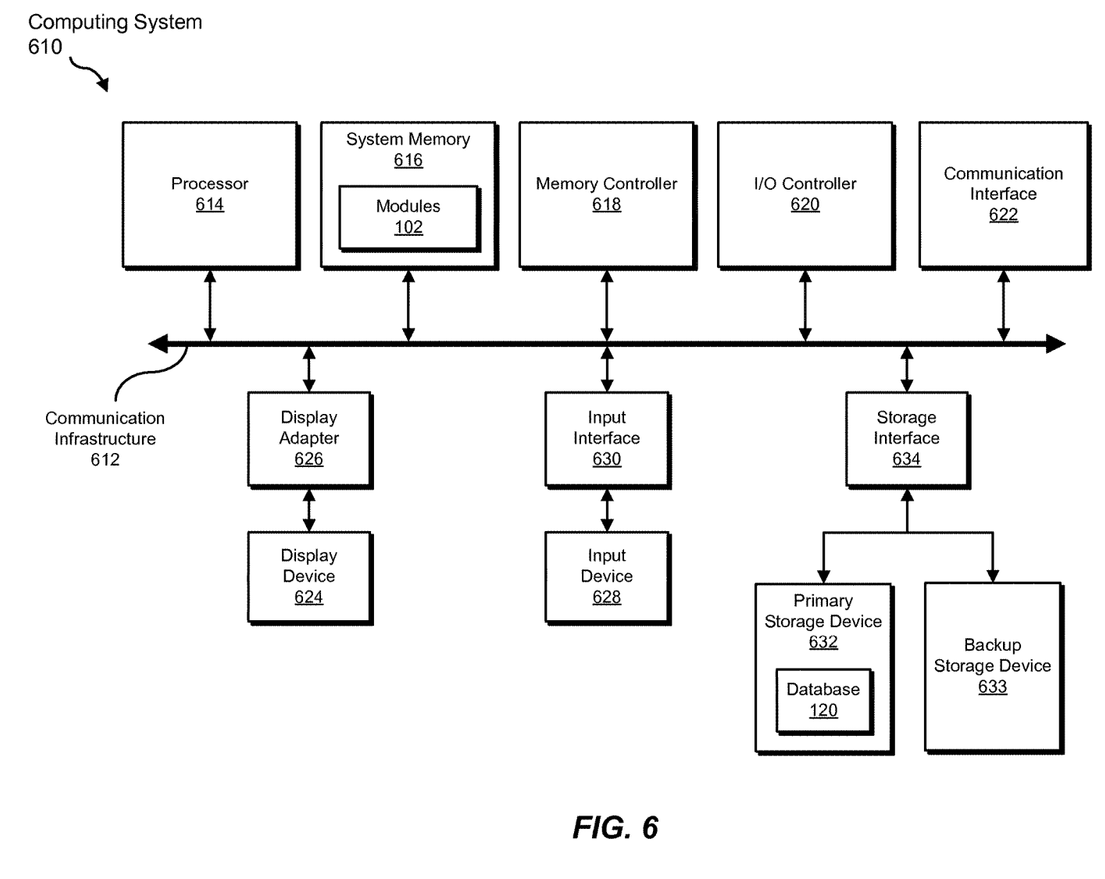
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 4). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
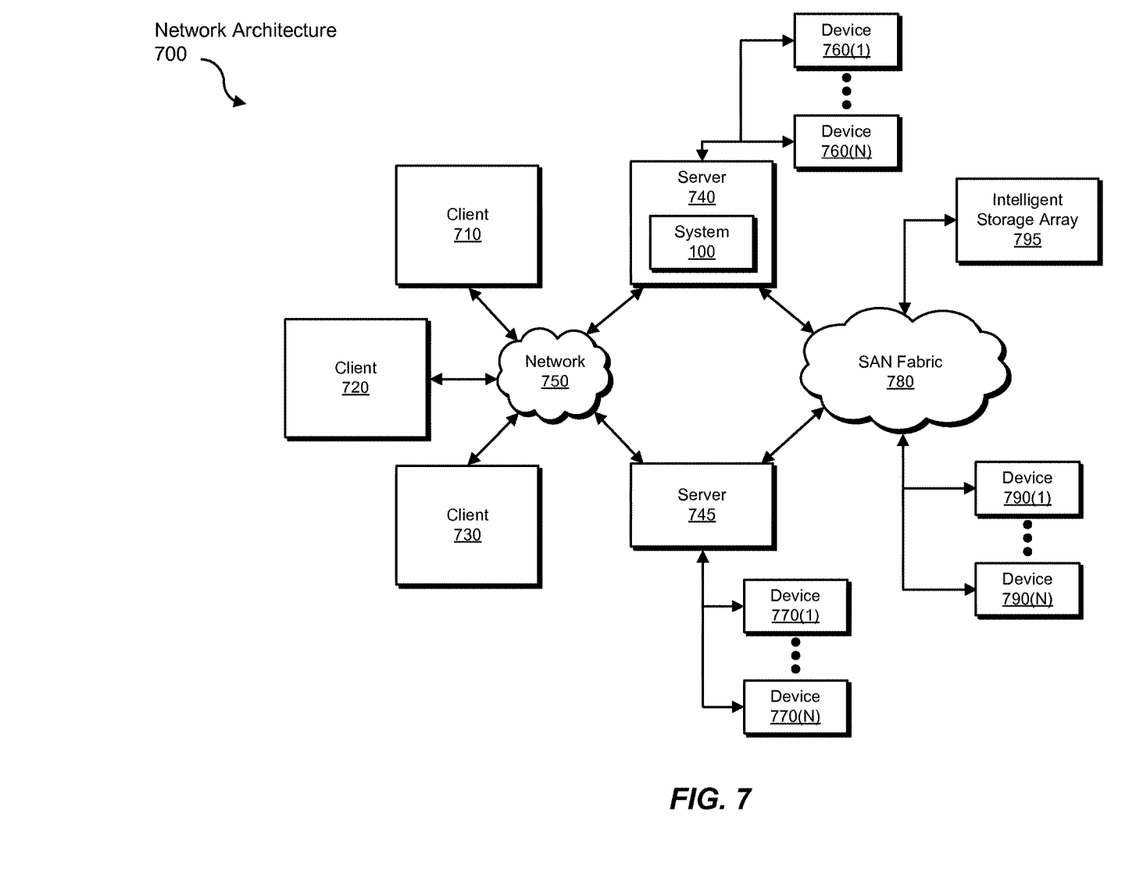
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 4). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for remediating the effects of malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data changes to be transformed, transform the data changes, output a result of the transformation to log changes made by a file on a computing system, store the result of the transformation to protect a computing system against the effects of malware, and use the result of the transformation to remediate the effects of malware. Alternatively, one or more of the modules described herein may transform a computing system into a system for remediating the effects of malware. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for remediating the effects of malware, at least a portion of the method being performed by a computing device comprising at least one processor, the method comprising:
    identifying a plurality of files on a client device;
    determining, using digital fingerprints that identify the plurality of files, that reputation of each of the plurality of files is unknown;
    in response to determining that the reputation of each of the plurality of files is unknown, logging changes made by the plurality of files to the client device;
    obtaining additional information indicating that an unknown file of the plurality of files represents a threat to the client device;
    in response to obtaining the additional information, reclassifying the plurality of files as a threat and determining that the changes made by the plurality of files are to be reversed; and
    in response to determining that the changes made by the plurality of files are to be reversed, initiating reversal of the changes made by the plurality of files by instructing the client device to reverse the changes made by the plurality of files to the client device that were logged during a logged time interval that is less than a time period during which the plurality of files were present on the client device.

2. The computer-implemented method of claim 1, wherein logging the changes made by the plurality of files to the client device comprises:
    obtaining at least one snapshot of at least one volume; and
    comparing contents of at least one additional file to copies of the plurality of files in the at least one snapshot to identify changes in the contents of the plurality of files.

3. The computer-implemented method of claim 1, wherein determining that the changes made by the plurality of files are to be reversed comprises at least one of:
    determining that the reputation for at least one of the plurality of files is untrustworthy;
    determining that at least one of the plurality of files includes malware;
    detecting malicious behavior performed by at least one of the plurality of files;
    receiving a request from a user to reverse changes made by at least one of the plurality of files;
    receiving a request from a client agent to reverse changes made by at least one of the plurality of files;
    receiving a request from an information security service to reverse changes made by at least one of the plurality of files;
    detecting damaging behavior performed by at least one of the plurality of files; and
    receiving notification that at least one of the plurality of files contains a security vulnerability.

4. The computer-implemented method of claim 1, wherein instructing the client device to reverse the changes made by the plurality of files to the client device comprises providing the client device with the changes made by the plurality of files to the client device that were logged during the logged time interval.

5. The computer-implemented method of claim 1, wherein instructing the client device to reverse the changes made by the plurality of files to the client device comprises providing the client device with a location of at least one volume snapshot.

6. The computer-implemented method of claim 1, wherein determining that the changes made by the plurality of files are to be reversed comprises determining that the changes made by the plurality of files to the client device that were logged during the logged time interval are to be reversed.

7. A system for remediating the effects of malware, the system comprising:
    an identification module, stored in a memory, that identifies a plurality of files on a client device;
    a reputation module, stored in the memory, that determines, using digital fingerprints that identify the plurality of files, that reputation of each of the plurality of files is unknown;
    a logging module, stored in the memory, that, in response to determining that the reputation of each of the plurality of files is unknown, logs changes made by the plurality of files to the client device;
    an evaluation module, stored in the memory, that:
        obtains additional information indicating that an unknown file of the plurality of files represents a threat to the client device; and
        in response to obtaining the additional information, reclassifies the plurality of files as a threat and determines that the changes made by the plurality of files are to be reversed;

a notification module, stored in the memory, that, in response to determining that the changes made by the plurality of files are to be reversed, initiates reversal of the changes made by the plurality of files by instructing the client device to reverse the changes made by the plurality of files to the client device that were logged during a logged time interval that is less than a time period during which the plurality of files were present on the client device; and at least one physical processor configured to execute the identification module, the reputation module, the logging module, the evaluation module, and the notification module.

8. The system of claim 7, wherein the logging module logs the changes made by the plurality of files to the client device by:
- obtaining at least one snapshot of at least one volume; and
- comparing contents of at least one additional file to copies of the plurality of files in the at least one snapshot to identify changes in the contents of the plurality of files.

9. The system of claim 7, wherein the reputation module determines that the changes made by the plurality of files are to be reversed by at least one of:
- determining that the reputation for at least one of the plurality of files is untrustworthy;
- determining that at least one of the plurality of files includes malware;
- detecting malicious behavior performed by at least one of the plurality of files;
- receiving a request from a user to reverse changes made by at least one of the plurality of files;
- receiving a request from a client agent to reverse changes made by at least one of the plurality of files;
- receiving a request from an information security service to reverse changes made by at least one of the plurality of files;
- detecting damaging behavior performed by at least one of the plurality of files; and
- receiving notification that at least one of the plurality of files contains a security vulnerability.

10. The system of claim 7, wherein the notification module instructs the client device to reverse the changes made by the plurality of files to the client device by providing the client device with the changes made by the plurality of files to the client device that were logged during the logged time interval.

11. The system of claim 7, wherein the notification module instructs the client device to reverse the changes made by the plurality of files by providing the client device with a location of at least one volume snapshot.

12. A non-transitory computer-readable medium comprising one or more computer-readable instructions that, when executed by at least one processor of a computing device, cause the computing device to:
- identify a plurality of files on a client device;
- determine, using digital fingerprints that identify the plurality of files, that reputation of each of the plurality of files is unknown;
- in response to determining that the reputation of each of the plurality of files is unknown, log changes made by the plurality of files to the client device;
- obtain additional information indicating that an unknown file of the plurality of files represents a threat to the client device;
- in response to obtaining the additional information, reclassify the plurality of files as a threat and determine that the changes made by the plurality of files are to be reversed; and
- in response to determining that the changes made by the plurality of files are to be reversed, initiate reversal of the changes made by the plurality of files by instructing the client device to reverse the changes made by the plurality of files to the client device that were logged during a logged time interval that is less than a time period during which the plurality of files were present on the client device.

* * * * *